United States Patent [19]

Jeddeloh et al.

[11] Patent Number: 5,187,779
[45] Date of Patent: Feb. 16, 1993

[54] MEMORY CONTROLLER WITH SYNCHRONOUS PROCESSOR BUS AND ASYNCHRONOUS I/O BUS INTERFACES

[75] Inventors: Joseph M. Jeddeloh; Ronald J. Larson, both of Minneapolis; Jeffry V. Herring, Bloomington, all of Minn.

[73] Assignee: Micral, Inc., New Brighton, Minn.

[21] Appl. No.: 392,705

[22] Filed: Aug. 11, 1989

[51] Int. Cl.$^5$ .................. G06F 13/00; G06F 13/14
[52] U.S. Cl. ......................... 395/325; 395/275; 395/425; 364/DIG. 1; 364/DIG. 2
[58] Field of Search ............ 364/200, 900; 395/400, 395/425

[56] References Cited

U.S. PATENT DOCUMENTS

| | | | |
|---|---|---|---|
| 4,438,492 | 3/1984 | Harmon, Jr. et al. | 364/200 |
| 4,573,118 | 2/1986 | Damouny et al. | 364/200 |
| 4,604,689 | 8/1986 | Burger | 364/200 |
| 4,615,017 | 9/1986 | Finlay et al. | 364/900 |

OTHER PUBLICATIONS

W. E. Tutt, "Common I/O and Storage Interface", IBM Technical Disclosure Bulletin, vol. 19, #10, Mar. 1977, p. 3643.

Chips and Technologies, Inc., 3050 Zanker Road, San Jose, Calif. 95134, Preliminary Specification, Chips/280, Model 70/80 Compatible Chipset (16-, 20-, 25-, & 33-MHZ*).

Primary Examiner—Joseph L. Dixon
Assistant Examiner—Reba I. Elmore
Attorney, Agent, or Firm—Davis & Schroeder

[57] ABSTRACT

An asynchronous memory control Unit for asynchronously controlling access to and from system memory of a microcomputer system in response to control signals from conventional and state-of-the-art microcomputer I/O buses is described. The asynchronous memory control unit of the present invention operates cooperatively with a synchronous memory control unit which provides access to and from system memory in response to command signals from a microprocessor. Whenever the microprocessor controls the bus, the synchronous memory control unit is enabled; whenever the microprocessor is not controlled of the bus at main IO bus, the asynchronous control unit is enabled.

4 Claims, 3 Drawing Sheets

MEMORY CONTROLLER WITH SYNCHRONOUS PROCESSOR BUS AND ASYNCHRONOUS I/O BUS INTERFACES

BACKGROUND AND SUMMARY OF THE INVENTION

The present invention relates to memory controllers for use in microcomputer systems incorporating commercially available microprocessor chip sets. In particular, this invention relates to microcomputers in which an asynchronous memory controller is used to access the system memory asynchronously with respect to the operational speed of the microprocessor chip set. Memory controllers generally provide control signals for writing data to and reading data from system memory.

Microprocessor and memory chip sets are advancing rapidly and are expected to continue to advance indefinitely. Moreover, microprocessor and memory chip sets are advancing at different rates so that the difference in performance parameters, particularly operational speed, of the microprocessor, the memory and the bus over which they typically communicate tends to expand or contract, i.e., become greater or lesser, as advances are perfected. In addition, performance characteristics of microcomputers chip sets employing emerging technologies also advance at different rates.

While present-day microcomputer manufacturers have control over the design and configuration of the systems they produce, they typically must anticipate the parameters necessary for compatibility of their system with new microprocessors and memory devices, as well as add-on peripherals, accessories and memory options produced by other manufacturers. The performance and interface characteristics of microprocessors and memory devices often vary substantially from one release of the same device to the next; similarly such characteristics of peripherals, accessories and memory options will vary among the manufacturers of these devices.

While the performance characteristics of peripheral devices are often designed for less than optimum performance, i.e., "detuned" to accommodate variations in microcomputer system designs, microprocessor chip and memory devices are not usually so detuned. Therefore, the manufacturer of high performance microcomputers must allow for different, even inferior, performance characteristics of peripheral and accessory devices and some memory options in order to produce a system which is compatible with the maximum number of devices attachable to the system. In addition, the microcomputer manufacturer must anticipate upgrades and changes of microprocessor chip sets and memory devices. If the microcomputer manufacturer does not so anticipate such upgrades, it will limit the marketability of the system to less than the total market available for his product.

A complete microcomputer, which is often intended for desktop applications, includes subsystems such as a central processing unit (hereafter referred to as the "CPU", "processor" or "microprocessor"), a math "coprocessor", DMA capabilities, memory, miscellaneous system ports, and interfaces to video, keyboard, floppy disks, serial and parallel ports, scsi devices, and a mouse pointing device.

The microcomputer functions by manipulating address, data, and control signals among the subsystems within the system. The control data flow into and out of system memory is provided by a memory controller which usually controls the data flow and timing between the processor, main system memory, and the bus.

As faster microprocessor and memory devices became available to microcomputer system designers, increased performance was limited by other components of the systems. For example, the speed of memory controller technology could not be expected to increase at a rate commensurate with the increasing speed of the microprocessor and memory devices, especially as the relative operation of microprocessors and memory devices is changed and changed at different rates.

If the memory controller were simply driven faster to take advantage of the faster microprocessors and memory devices now becoming available, certain memory devices would begin to fail in different ways in different systems. The faster the memory controller is driven to keep pace with microprocessors, the more memory devices would fail and start to fail. Failure modes include loss of data, and loss of address and control signals. Therefore, a microcomputer system which incorporates faster microprocessor technologies, e.g. 20 or 25 MHz, slower memory device technologies, and still slower input/output (I/O) bus technology, e.g., operating at 8 MHz, is extremely desirable.

While development of memory components such as Dynamic Random Access Memory ("DRAM") devices have usually kept pace with processor technology, often the control logic for these devices does not. Such logic functions and technology were also a limitation on overall microcomputer system speed. For example, in order for the processor to access memory, access signals must be produced in response to bus controller strobe signals which, in turn, are produced in response to access request signals from the microprocessor. Additive overhead associated with both the bus and memory controllers arising from buffering and gate delays is required to produce these signals. Thus, the need is clear for system memory control to be dissociated from the speed of advancing microprocessor technology on the one hand and from conventional or state-of-the-art bus/bus controller technology on the other, not withstanding the high degree of interaction between the processor and system memory.

The speed of operation of microcomputer subsystems is governed by one or more clock or timing signals which may or may not be synchronized. In the past, such clock signals were usually derived from more than one source which was not synchronized. Thus, when synchronized operation of the microprocessor and system memory was required, tolerances in the timing of control, gating and handshake signals had to be relaxed enough to allow for imprecise cooperation of clock signal source. For microcomputers operating at 8 MHz, performance was acceptable and reasonably reliable.

As operating speed is increased, however, critical system timing parameters must be substantially more precise than can be reliably achieved with multi-source clock signals. Thus, for operation at 20 MHz and above, clock signals produced from one source are required to preclude clock and control signal skewing and provide reliable, high-speed operation.

System memory control according to the present invention comprises a synchronous controller for interface with the microprocessor of the designer's choice and an asynchronous memory controller for direct interface with present state-of-the-art input/output (I/O)

bus technology such as the Micro Channel Architecture (MCA) manufactured by IBM Corporation. Thus, accessing of 80 nanosecond DRAM available from any number of manufacturers, by either the controller of the present invention, high-speed microprocessors or bus-coupled devices in a microcomputer, a bus timing system having enhanced performance characteristics is facilitated. By dividing system memory control according to the present invention, the evolving technologies of microprocessors and DRAM are anticipated and neither are hampered by the speed of the MCA or pace of development or nature of other conventional bus technology. It is also desirable to have asynchronous memory controller technology for access to memory by bus coupled devices without impacting, i.e., detuning, the performance of either the microprocessor or system memory.

The asynchronous control unit of the present invention provides bus-coupled devices with asynchronous access to a microcomputer system memory in response to control signals from the main I/O bus. Synchronous memory controllers are well known for providing the microprocessor access to system memory in response to command signals from the microprocessor. The present invention may be used to enhance the performance characteristics of the overall microcomputer system by providing separate access to memory for devices and subsystems coupled to the main I/O bus at speeds different from those required by high performance microprocessors. Thus, with the control unit with the present invention, buffering, control signal conditioning or other additive overhead previously required for access to and from system memory by I/O bus-coupled devices via a synchronous memory controller is eliminated. Meta stability problems on the boundary of the synchronous and asynchronous domains are also eliminated.

DESCRIPTION OF THE PREFERRED EMBODIMENT

Figure 1:
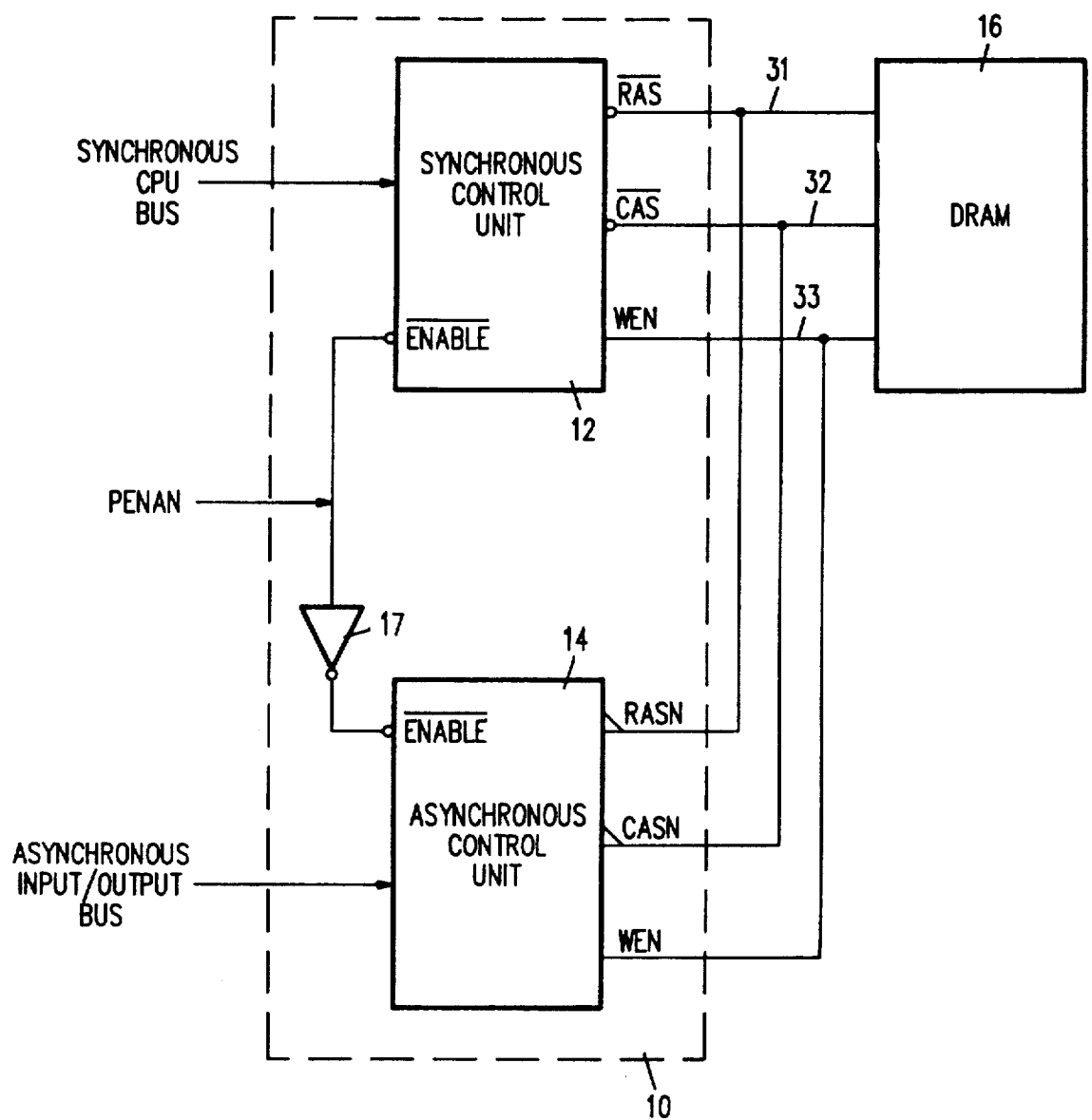
FIG. 1 is a block diagram of a memory control system employing an asynchronous memory control unit constructed according to the principles of the present invention.

Memory control system 10, according to the present invention, comprises synchronous control unit 12 and asynchronous control unit 14. Control units 12 and 14 each produce row and column address (RAS and CAS, respectively) signals and a write enable (WEN) signal for accessing Dynamic Random Access Memory (DRAM) 16. The designation for RAS and CAS signals, as well as other signals described herein, may also include a suffix N, such RASN and CASN. Such designation is used merely to indicate that such signals are active at low voltage or negative polarity.

Synchronous Control Unit 12 may be any commercially available memory controller suitable for producing RAS, CAS and WEN signals response to commands from a microprocessor, such as the synchronous GC182 Memory Controller produced and marketed by G2 Incorporated. DRAM 16 may be any commercially available DRAM devices, preferably having high speed performance characteristics suitable for receiving RAS, CAS and WEN signals produced by synchronous unit 12. Such DRAM devices include the HM 5110003 and the MB 81C1000 80 NS devices manufactured by Hitachi and Fujitsu, respectively.

Asynchronous control unit 14 produces RAS, CAS and WEN signals 31, 32 and 33, respectively, in response to control signals from the main I/O bus. In the preferred embodiment of the present invention, asynchronous control unit 14 is designed to receive control signals produced by and for interfacing with the MCA bus as described in the Technical Reference manual for the IBM Personal System/2 microcomputer which is incorporated by reference as if fully set forth herein.

Synchronous control unit 12 and asynchronous control 14 are both enabled by a signal referred to as the PENAN signal. As will be explained herinafter, the PENAN signal may be derived from a signal associated with an Intel 80386 microprocessor chip. PENAN is low (i.e. negative) when synchronous control unit 12 is enabled; PENAN is high (i.e. positive) when asynchronous control unit 14 is enabled. Thus, both controllers are never enabled at the same time.

The state of the PENAN signal is determined by the microprocessor. If an 80386 microprocessor chip, produced by Intel, Inc., is used, PENAN is derived from a hold acknowledge signal, abbreviated to the acronym or mnemonic the HOLDACK signal produced by the microprocessor in response to a microprocessor hold request signal. Thus, when the microprocessor controls the Microchannel Architecture or MCA bus, synchronous unit 12 is used to access DRAM 16. Conversely, when the microprocessor does not have control of the MCA bus, asynchronous controller unit 14 is used to access DRAM 16.

Synchronous control unit 12 is typically a high speed controller operating in the 25 to 33 MHz range, having zero wait states and 40 nanosecond cycle times. In contrast, asynchronous control unit 14 is slower-speed system, operated typically on 200 nanosecond memory cycle time. Inverter 17 assures that asynchronous control unit 14 is never enabled at the same time synchronous control unit 12 is enabled.

Figure 2:
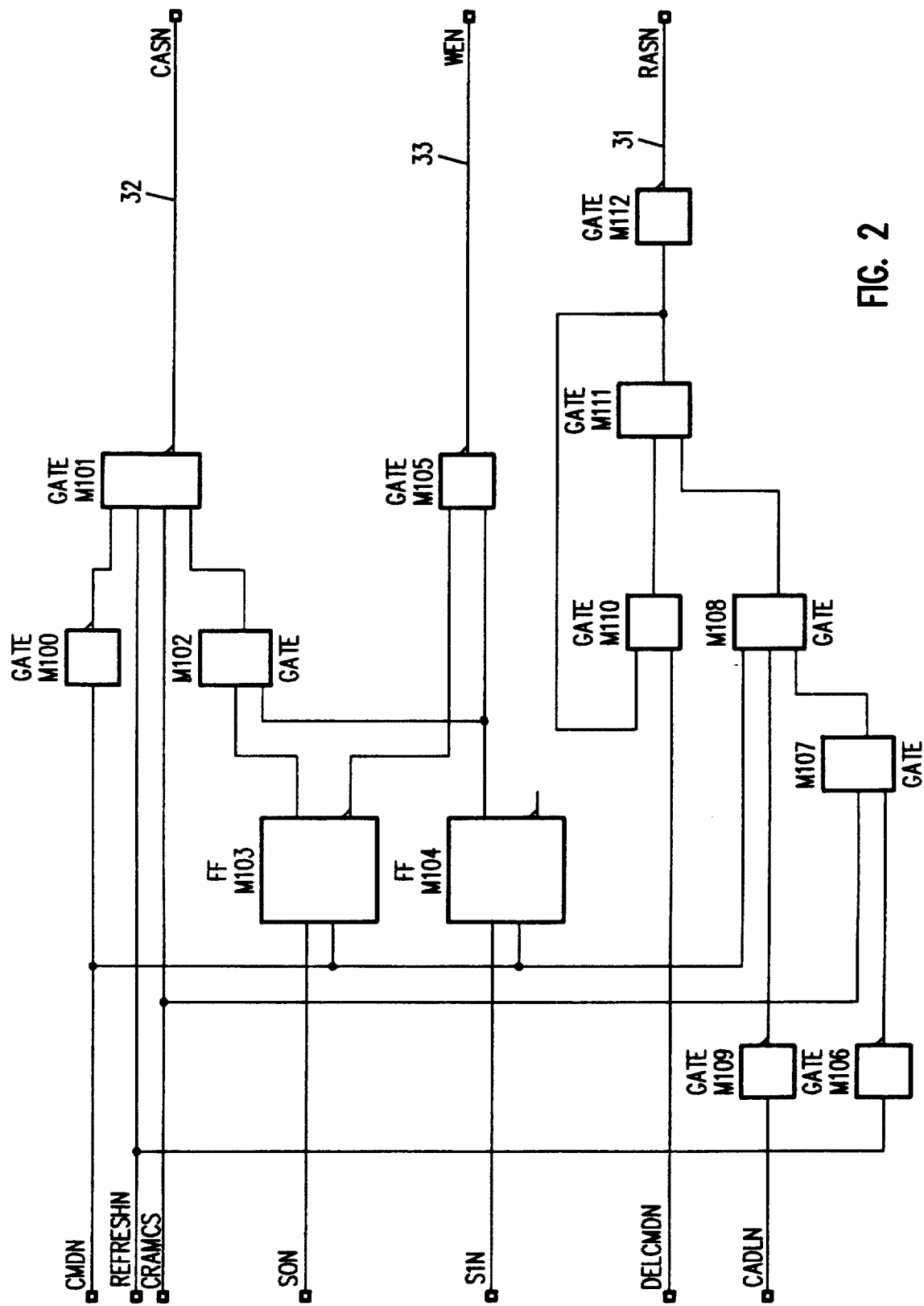
FIG. 2 is a block diagram of the asynchronous memory control unit the employed by the memory control system of FIG. 1.

Referring now to FIG. 2, asynchronous control unit 14 comprises gates M100-M102, M105-M112 and flip-flops M103-M104. Asynchronous control unit 14 produces RAS, CAS and WEN signals response to the logical combination of MCA signals CMD (command signal), Refresh, CRAMCS (address and status decode signal that indicates memory access), SO (status bit zero bus state—MCA write/read identification) and Sl (status bit one bus state—MCA write/read identification), DELCMD (delayed version of command signal), and CADL (address decode latch—MCA address valid indicator), as described elsewhere in this specification. DELCMD is a delayed version of MCA signal CMD, and CRAMCS is an address and status decode signal from the MCA which indicates a memory access.

Referring now to FIG. 2, asynchronous control unit 14 produces WEN signal 33 in response to SON (status bit zero bus state signal with the suffix "N" to indicate that the signal is active at low voltage or negative polarity) and SIN (status bit one bus state signal with the suffix "N" to indicate that the signal is active at low voltage or negative polarity) according to the relation

WEN=SON' NAND SIN, where SON' is the complement of SON. SON and SIN signals are clocked by CMDN signal becoming active, i.e. low, via clocked latches M103 and M104.

Figure 3:
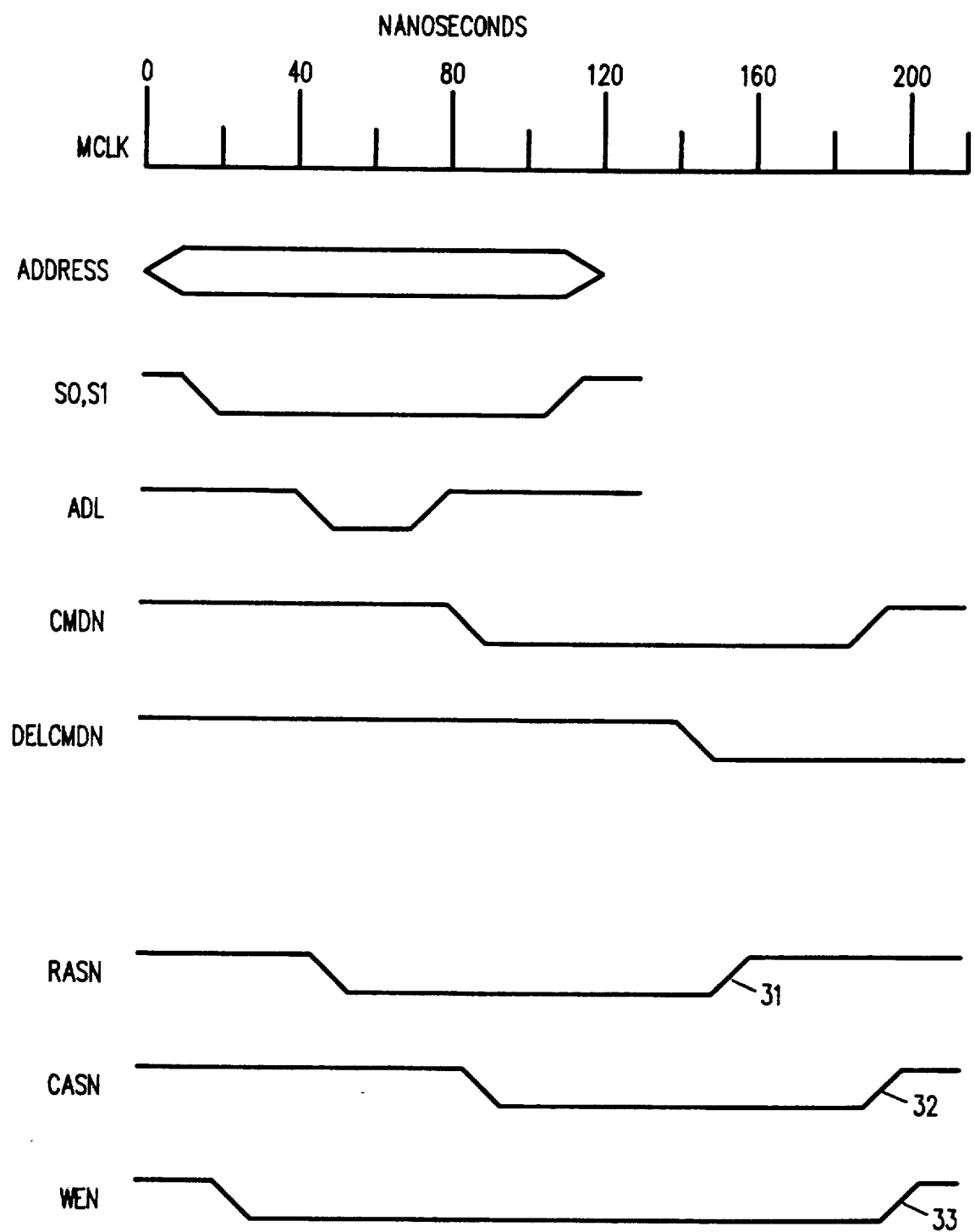
FIG. 3 a timing diagram for control signals produced by the asynchronous memory control unit of FIGS. 1 and 2.

With continuing reference to FIGS. 2 and 3, asynchronous control unit 14 produces RASN (row address strobe signal with the suffix "N" to indicate that the signal is active at low voltage or negative polarity) signals 31 in response to CADLN (address decode latch signal to indicate address valid with the suffix "N"0 to indicate that the signal is active at low voltage or negative polarity) or REFRESHN (memory refresh in progress signal with the suffix "N" to indicate that the signal is active at low voltage or negative polarity) signals becoming active. RASN remains active until, and becomes inactive (i.e., high) when, OR gate M111 opens in response to DELCMDN becoming active (i.e., low).

CASN signal is produced by 4-input NAND gate M101 when CMDN becomes active in the presence of several other MCA signals according to the relation

CASN=[[SON XOR SIN]* CRAMCS *
REFRESHN * CMDN']'.

where CMDN' is the complement of CMDN. The function [SON XOR SIN] is produced by XOR gate M102, and CMDN' is produced by inverter M100.

As indicated in FIG. 1, in the preferred embodiment, the output ports of asynchronous control unit 14 are wire-ored with the output ports of synchronous control unit 12 at the input ports of DRAM 16. Similarly the WEN signal port of asynchronous control unit 14 is wire-ored with the analogous port of synchronous control unit 12 at the write enable port DRAM 16. This configuration is facilitated by the tri-state signals produced by the bi-cmos components of asynchronous control unit 14.

We claim:

1. In a microcomputer system having a microprocessor and a synchronous bus and having an asynchronous bus, said asynchronous bus having bus control signals and said microprocessor producing command signals, a memory control system for interfacing both said synchronous bus and said asynchronous bus to a single memory subsystem, said memory control system comprising:
   synchronous control means coupled to said microprocessor and to said synchronous bus for producing synchronous memory address signals and synchronous write enable signals in response to command signals from said microprocessor;
   asynchronous control means coupled to said asynchronous bus for producing asynchronous memory address signals and asynchronous write enable signals in response to bus control signals;
   a single memory subsystem comprising a dynamic random access memory coupled to said synchronous control means and to said asynchronous control means and responding said synchronous memory address signals, said synchronous write enable signals, said asynchronous memory address signals and said asynchronous write enable signals; and
   logic means coupled to said microprocessor, synchronous control means and asynchronous control means for enabling one of said control means and for disabling the other of said control means in response to a command signal from said microprocessor.

2. A memory control system as in claim 1 wherein said logic means is effective for enabling either said synchronous control means or for enabling said asynchronous control means but prevents both control means from being active at the same time.

3. A method for controlling access to and from a single memory system in a microcomputer having two buses, one of said buses being a synchronous microprocessor bus and the other of said buses being an asynchronous input/output bus, said asynchronous input/output bus having bus control signals, said method comprising the steps of:
   producing synchronous memory address signals and write enable signals in response to command signals from said microcomputer;
   producing asynchronous memory address signals and write enable signals in response to bus control signals; and
   enabling either a synchronous control means or an asynchronous control means in response to a command signal from said microcomputer but preventing both control means from being active at the same time.

4. A memory controller for selectively interfacing a dynamic random access memory with a synchronous central processing unit bus and with an asynchronous input/output bus, said memory controller comprising:
   a synchronous control unit coupled to a synchronous central processing unit bus, said synchronous control unit providing synchronous row address signals, column address signals and write enable signals;
   an asynchronous control unit coupled to an asynchronous input/output bus, said asynchronous control unit providing asynchronous row address signals, column address signals and write enable signals;
   a single memory subsystem comprising a dynamic random access memory coupled to said synchronous control unit and to said asynchronous control unit and responding to said row address signals, to said column address signals and to said write enable signals; and
   an invertor connected between an enable terminal on said synchronous control unit and an enable terminal on said asynchronous control unit, thereby permitting only one of said control units to be enabled at a time.

* * * * *